United States Patent
Mcmurren

[11] Patent Number: 6,040,079
[45] Date of Patent: Mar. 21, 2000

[54] BATTERY ELECTROLYTE LEVEL INDICATOR

[76] Inventor: Irving B. Mcmurren, 821 Arguilla Rd., Palm Springs, Calif. 92262

[21] Appl. No.: 08/919,251

[22] Filed: Aug. 28, 1997

[51] Int. Cl.[7] .................................................. H01M 10/48
[52] U.S. Cl. ................................................................ 429/91
[58] Field of Search ................................. 429/90, 91, 92, 429/93

[56] References Cited

U.S. PATENT DOCUMENTS

| | | | |
|---|---|---|---|
| 1,312,494 | 8/1919 | Wheeler | 429/93 |
| 2,056,578 | 10/1936 | Lepore | 429/90 |
| 4,625,201 | 11/1986 | Berry | 340/636 |

FOREIGN PATENT DOCUMENTS

| | | | |
|---|---|---|---|
| 59-14275 | 1/1984 | Japan | 429/93 |

Primary Examiner—Maria Nuzzolillo
Assistant Examiner—Susy Tsang
Attorney, Agent, or Firm—Robert J. Schaap

[57] ABSTRACT

A battery electrolyte level indicator constructed for substitution of a battery cap on a multi-cell battery. The electrolyte level indicator has an outer housing construction in the shape of a cap to be screw mounted into the open upper end of the port leading into the battery cell. A probe extends from the housing or cap, into the battery electrolyte. A light indicator, such as a light emitting diode, is mounted on the exterior of the cap housing and will become automatically energized in a fail-safe condition if the electrolyte is at a sufficient level within the cell. However, if the level of the electrolytes should drop below the depth of the probe, then the indicator light will be deenergized, thereby immediately providing an advisory signal to the operator of an unsafe battery condition. The probe is constructed so as to operate as an anode in combination with a cathode of the battery. Moreover, the probe is formed of a material which, when connected in this arrangement, is highly resistant to corrosion.

22 Claims, 2 Drawing Sheets

BATTERY ELECTROLYTE LEVEL INDICATOR

BACKGROUND OF THE INVENTION

1. Field of the Invention

This invention relates in general to certain new and useful improvements in battery electrolyte level indicators and method of use therefor, and more particularly, to a battery electrolyte level indicator which operates in a fail-safe mode and includes an indicator light mounted directly on an electrolyte level indicator battery cap which can be substituted for a conventional battery cap.

2. Brief Description of the Related Art

Batteries used on many types of industrial equipment and particularly industrial equipment which is electrically operable, are subject to substantial power loads. In many pieces of industrial equipment, three or more individual batteries, each containing a plurality of cells, may be used. These power loads and the heat generated by the equipment in which they are used will frequently cause a heating, if not an over-heating, of the battery or a bank of these batteries.

Frequently, if a battery is operated when the electrolyte level in one or more of the cells is at a dangerously low condition, the operation of that battery can result in serious damage, if not total loss, of the battery. Moreover, these industrial-type batteries are quite expensive and replacement can become a costly overhead factor if the battery electrolyte is not frequently checked and battery damage results.

In many cases, the only means for literally investigating the level of electrolyte in a battery cell was to unscrew and remove the battery cap of that cell, and physically examine the cell. Due to the time and effort involved in checking the electrolyte level in a battery, this simple investigatory step is often overlooked or either avoided. Hence, an operator of equipment will merely attempt to use the equipment without knowing whether or not the batteries are in a safe operating condition. This is particularly true in the case of leased or rented equipment where the batteries may be destroyed during the lease or rental period.

There have been several proposals to provide a battery electrolyte level indicator in which battery electrolyte sensors were connected through a wiring harness to a level indicator for visual examination by an operator of the vehicle. This type of arrangement has proved to be not only quite costly, but complicated to employ. There has also been a proposal to provide a display in the form of a light-emitting diode for each battery, and which could be mounted on the exterior of the battery compartment. This type of arrangement was abandoned due to the high cost, not only by the electrical complexity, but again, with a wiring harness necessary to connect the batteries. Moreover, this type of arrangement could result in damage to the battery and void any factory service warranty.

There has been a need for some type of indicator which can be connected directly to one or more cells of a battery in order to determine whether or not there is a sufficient level of electrolyte within the one or more cells of the battery. Ideally, there has been a need for some type of battery level indicator which will connect directly to the cell of the battery, as a replacement for a battery cap on the battery. Such an electrolyte level indicator would reduce, if not fully eliminate, the substantial loss incurred in the operation of batteries without sufficient electrolyte levels.

There have been several proposed battery electrolyte level indicators, as, for example, those taught in U.S. Pat. No. 4,913,987, dated Sep. 20, 1988, to Dattilo, and as taught in U.S. Pat. No. 4,981,764, dated Jan. 1, 1991, to Dattilo. Each of these battery electrolyte level indicators operated as a replacement for a normal battery cap, and which screwed into the cell access port of a battery cell. Each cap contained a metal probe, which extended downwardly into the electrolyte of the battery cell, and also contained a terminal connected to that probe, which extended outwardly beyond the battery cap. An indicator, such as an indicator light or the like, was ultimately connected to this conductor, which extended beyond the battery cap in order to apprise an operator of the potentially low battery electrolyte level.

There are several problems with remote indicators used in connection with the devices of the type taught in the Dattilo patent, as well as in other prior art patents. Generally, it has been found in the present invention that a simple battery electrolyte level indicator directly on the cell of the battery is a preferred arrangement. The remote type indicator system has been found to be relatively unreliable, and oftentimes provides erroneous level indications. Another problem with the commercially available electrolyte level indicators is the fact that the probe, which is immersed into the battery electrolyte, is subject to rapid erosion. Moreover, the presently available probe arrangements used in remote indicators also consume an excessive amount of power, merely to provide a battery level indication.

There has been a need for a battery electrolyte level indicator which will provide a reliable and accurate indication of a battery electrolyte level, and which indicator can serve as a replacement for a battery cap. There has been a further need for a battery electrolyte level indicator of this type in which a probe into the electrolyte will not be subject to rapid erosion from the electrolyte, and which will also provide accurate and reliable indication readings without consuming a substantial amount of power.

OBJECTS OF THE INVENTION

It is, therefore, one of the primary objects of the present invention to provide a battery electrolyte level indicator which can serve as a replacement for a battery cap and which is highly reliable and efficient in operation.

It is another object of the present invention to provide a battery electrolyte level indicator which includes a level indicator mounted directly on a substitute cap for a battery cell, such that it is easily visible.

It is a further object of the present invention to provide a battery electrolyte level indicator of the type stated which uses an electrical circuit arrangement such that a probe of the indicator is not subject to rapid erosion.

It is an additional object of the present invention to provide a battery electrolyte level indicator of the type stated which eliminates need for external conductors extending from a replacement battery cap, and which is effectively self-contained.

It is another salient object of the present invention to provide a battery electrolyte level indicator of the type stated which is highly reliable in operation, and which can be constructed at a relatively low unit cost.

With the above and other objects in view, my invention resides in the novel features and form, construction, arrangement, and combination of parts presently described and pointed out in the claims.

SUMMARY OF THE INVENTION

The present invention relates in general to a unique and novel battery electrolyte level indicator in the form of a battery cap which can be substituted for an existing battery cap, and which is highly reliable and does not suffer from the numerous disadvantages of previous battery electrolyte level indicators.

The battery electrolyte level indicator of the present invention exists in the form of a cap which is threadibly mountable to a cell access port of a battery cell in essentially the same manner as a conventional battery cap. The battery cell cap of this invention exists in the form of a housing, preferably formed of a relatively non-corrosive material, such as a hard rubber or plastic material or the like, and includes a cap lid along with a depending boss containing threads for securement to the port of the battery cell. The battery cap of the present invention is modified in order to serve as a sensor for determining the level of electrolyte in the cell of a battery. Generally, the electrolyte must cover at least the plates of the battery in order to prevent damage to the battery. If the electrolyte level falls below the plates of the battery, then severe damage to the battery can result.

In accordance with the present invention, the battery cap functions as a self-contained battery electrolyte level indicator. This cap is sized to be substituted for and mounted directly in the port of the cell of the battery. The battery cap contains a light emitting diode or other light mounted directly thereon for indicating the condition of the battery. In this way, there is no need for a wiring harness or other type of electrically conductive arrangement for connection to some external display.

The battery electrolyte level indicator of the invention is designed to operate in a fail-safe condition, that is it will remain energized until the electrolyte level of the battery falls to a dangerously low level at which point the light is deenergized. Thus, if the operator does not observe an energized light on the electrolyte level indicator, the operator is immediately advised of a potentially dangerous electrolyte level condition in that cell of the battery. In this way, the operator does not have the concern of whether or not the light is operating or not operating.

In developing the self-contained battery electrolyte level indicator, it was important to insure that the battery itself remains unmodified. Any ports or holes drilled into the battery casing or the running of conductors through the battery itself would operate to eliminate any warranty on the battery and could also result in damage to the battery. Accordingly, the present invention provides a indicator which is self-contained and mounts directly to the battery itself without otherwise altering the battery.

The battery cap is also provided with means for mounting the cap into the port of the battery cell from which a conventional battery cap is removed. This means for mounting may adopt the same means that was used for holding the conventional battery cap on the port. Typically, this means for mounting may adopt the form of threaded turns on a depending boss from the cap.

A probe extends from the cap and into the electrolyte in electrically conductive relationship therewith. The probe has a length sufficient to determine if the electrolyte is at a proper level with respect to the cell of the battery. Thus, the probe is sized so that its lower end is approximately one-fourth inch above the upper edge of the plates. In this way, if the electrolyte level falls, the probe will no longer remain immersed in the electrolyte and the light on the probe will become deenergized.

As indicated previously, an indicator light is mounted on the cap and has a portion external to the cap so that it is readily observable when the battery is in use. This eliminates the need for a wiring harness. Finally, an electrically conductive means connects the light to the probe and enables an electrical circuit to be completed to a terminal of the battery. For this purpose, a separate electrical conductor may be employed for connecting the other terminal of the light to a terminal of the battery.

In a more preferred embodiment of the invention, as hereinafter described, the probe serves as an anode and therefore the other terminal of the light is connected to the cathode terminal of the battery. An insulating means is located beneath the light and in an insulating position so as to electrically insulate the conductor connected to the cathode from the probe itself.

As indicated previously, the probe serves as an anode as opposed to a cathode. In this way, the rapid oxidation which would otherwise affect the probe has been substantially reduced. Moreover, the probe is formed of a nickel alloy material. In this way, the life of the probe has been dramatically increased.

This invention possesses many other purposes and has other advantages which will be made more fully apparent from a consideration of the forms in which it may be embodied. A preferred embodiment of the invention is illustrated in the accompanying drawings and described in more detail in following detailed description of the invention. However, it should be understood that this detailed description and the accompanying drawings are set forth only for purposes of illustrating the general principles of the invention and that the invention is not to be taken in a limiting sense.

BRIEF DESCRIPTION OF THE DRAWINGS

Figure 1:
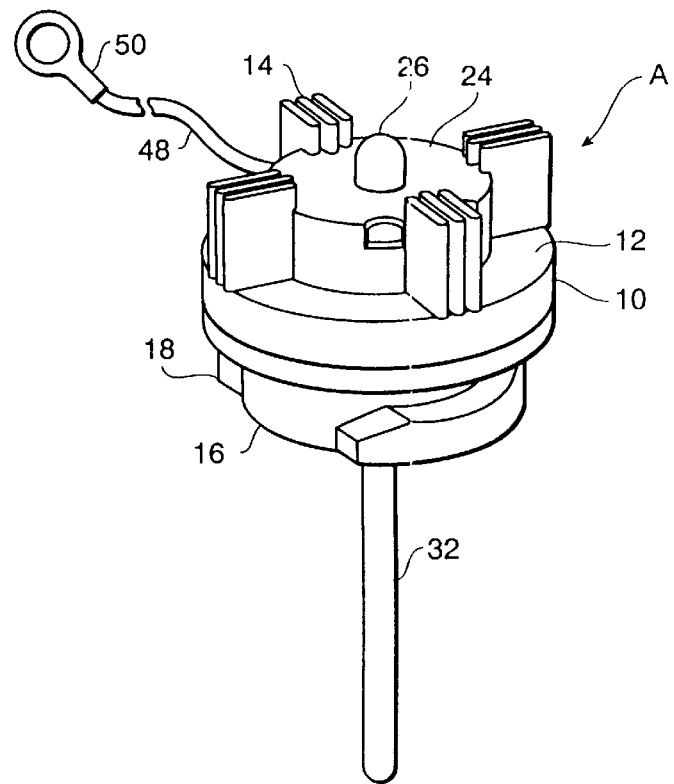
Figure 2:
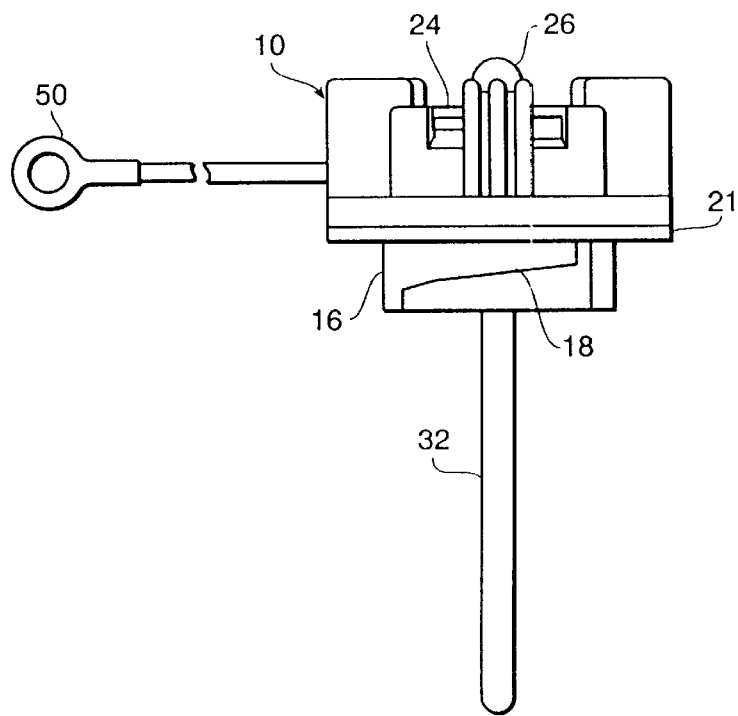
Figures 3, 4, 5:
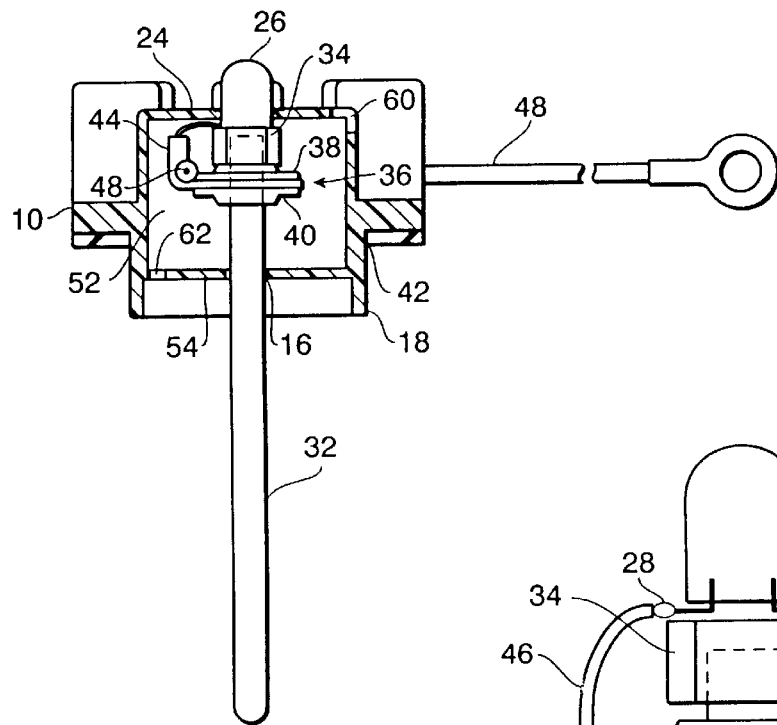

Having thus described the invention in general terms, reference will now be made to the accompanying drawings in which:

FIG. 1 is a perspective view of a self-contained battery electrolyte level indicator constructed in accordance with and embodying present invention;

FIG. 2 is a side elevational view of the battery electrolyte level indicator of the invention;

FIG. 3 is a sectional view showing the interior of the cap housing forming part of the battery electrolyte level indicator of the invention;

FIG. 4 is an exploded fragmentary elevational view showing a portion of the assembly of FIG. 3 and particularly the insulator and connection to the probe forming a part thereof; and FIG. 5 is a schematic diagram illustrating a preferred arrangement of connecting the electrolyte level indicator of the invention to a terminal of a battery with which the indicator is used.

DETAILED DESCRIPTION OF A PREFERRED EMBODIMENT

Referring now in more detail and by reference characters to the drawings which illustrate a preferred embodiment of the present invention, A designates a battery electrolyte level indicator which comprises an outer cap housing 10 similar to a conventional battery cap of the type normally used in these batteries. The battery cap housing 10 is usually comprised of an upper ring portion 12 having a plurality of (four as shown) circumferentially spaced apart and upstanding finger engaging tabs 14. In this way, user may engage the tabs 14 on the ring portion 12 and turn the battery cap housing for removal of same or for locking into the port of a battery cell.

The underside of the cap housing 10 is provided with a depending boss 16 having a threaded section 18, and in the embodiment as shown, comprises a single thread, such that one turn or even a portion of a turn may be sufficient to remove or remount a battery cap housing into the cell port of a battery. In this way, the battery cap can be conventionally mounted within the port of a battery cell by merely turning the same to cause a threaded connection in the port. However, other means for retaining the battery cap housing 10 could be employed. Further, a soft rubber gasket 21 is disposed against the underside of the housing 10 and surrounds the depending boss 16 in the manner as best illustrated in FIG. 2 of the drawings.

Projecting through an upper wall 24 of the battery cap housing and projecting upwardly therefrom is a light 26, preferably in the form of a light emitting diode. The light 26 may have two terminals, such as a positive terminal lead 28 and a negative terminal lead 30 which are typically spaced apart from one another. In the embodiment as shown, a probe 32 extends downwardly from a nylon insulator 34 located beneath the light emitting diode 26.

In a preferred embodiment of the invention, the probe 32 is centrally diametrically located on the cap housing 10, that is, it extends downwardly through an axial center-line passing through the cap housing 10. Further, and by reference to FIGS. 3 and 4, it can be seen that the probe could have its upper end extend through the insulator 34 so as to be readily connected to the positive terminal 28 of the light 26. This probe 32 is formed of an electrically conductive material and is connected to the positive terminal of the light emitting diode 26, as hereinafter described. Moreover, the probe 32 is located on the underside of the insulator 34. In accordance with the present invention, the probe is preferably made of a nickel alloy material.

The cap housing 10 is formed of an electrically non-conductive material and preferably of a relatively hard rubber or other plastic material. The insulator 34 is formed of a nylon material as indicated, although any relatively hard electrically non-conductive material also may be employed for this purpose.

Due to the fact that it is exceedingly difficult, if not virtually impossible, to obtain any reasonably secure solder connection to the probe 32, a conductive assembly 36 is located on the underside of the nylon insulator 34. This conductive assembly comprises a pair a push nuts 38 and 40 which capture therebetween a star ring 42 and the latter of which has an upwardly struck tab 44, as best shown in FIG. 4 of the drawings. In order to maintain an electrical connection from the positive terminal 28 to the probe 32, an additional conductor 46 is connected to the terminal 30 of the light emitting diode 26 and is also soldered or otherwise secured to the tab 44. Inasmuch as the star ring 42 is in electrically conductive relationship with the probe 32, a complete electrical circuit is achieved between the positive terminal 30 of the diode 26 and the probe 32.

It can be seen that the push nuts 38 and 40 are an effective means for physically securing the star ring 42 to the probe 32 adjacent the underside of the insulator 34, all as best shown in FIGS. 3 and 4 of the drawings. Thus, the conductor assembly 36 constitutes an effective system for physically securing these components together in a small, compact space and does not require manually intensive labor to achieve this securement.

An electrical conductor 48 is also connected to the negative terminal 30 of the light emitting diode 26, as best shown in FIGS. 3 and 4 of the drawings. In this case, both the electrical conductors 46 and 48 are insulated so as to maintain separate current paths with respect to the terminals 28 and 30 of the light emitting diode 26. The electrical conductor 48 is provided at its outer end with a ring terminal 50, as best shown in FIG. 1. This terminal 50 is provided for connection to a cathode terminal of the battery.

In the assembly of the battery electrolyte level indicator, the conductors 46 and 48 are first soldered to the leads 28 and 30 of the light emitting diode. Thereafter, the conductive assembly 36 is disposed over one end of the probe 32 and shifted along the probe to a position where it will ultimately engage the underside of the insulator 34. In this case, one push nut 40 is first inserted onto the probe, followed by star ring terminal 42 and the star ring terminal 42 is then fixably held in position by the upper push nut 38. The assembly 36 and the probe 32 are then immersed in a solder pot to join the star ring terminal 42 with the push nuts 38 and 40.

The probe 32 can then be inserted into a small bore formed in the underside of the insulator 34 which also serves as a spacer. At this point in time, the one electrical conductor 46 can then be soldered to the tab 44 on the star ring 42. In order to provide for physical securement of the conductor 48, the tab 44 is bent upwardly to the position as shown in FIG. 3 so as to capture a portion of the conductor 48 between the tab 44 and the insulator 34. This will provide for a rigid retention of the conductor in a fixed position.

It can be seen that the assembly of the various components forming part of this battery electrolyte level indicator is quite simple and relatively labor free. All that is required are a few simple steps including three individual soldering operations. Thus, the battery electrolyte level indicator can be constructed at a relatively low cost.

Any open space within the interior of the cap housing 10 is preferably filled with a filler, as for example, an epoxy material as designated by reference numeral 52 in FIG. 3 of the drawings. Further, the housing is then closed off at its lower end by means of a bottom lid 54, all as best shown in FIG. 3 of the drawings.

It can be seen that the conductor 48 and hence the ring terminal 50 are connected to the negative terminal of the light emitting diode 26 and the probe 32 is connected to the positive terminal 28 of this diode. Thus, a complete connection is made to the light emitting diode 26 so that the latter is always energized when there is a sufficient level of electrolyte in the battery.

If the level of the electrolyte in the battery cell should drop to a point below the lower end of the probe 32, electrical connection to the light emitting diode 26 will be interrupted and hence the light emitting diode 26 will become deenergized. This will advise the operator using this battery system that one or more cells of the battery does not have sufficient electrolyte therein.

The cap housing 10 is also provided with an opening 60 communicating with another opening 62 in the bottom lid 54. This arrangement allows for venting of any gases which may be generated in the cell of the battery. Electrical tests have shown that the battery drain using this arrangement is essentially negligible and constituting only about 2.3 milliamperes and which is significantly less than the self-discharge rate of the battery itself.

FIG. 5 illustrates an arrangement in which a pair of electrolyte level indicators are used in a multi-cell battery arrangement. In this case, only a pair of cells in the center of the battery are provided with the electrolyte level indicator of the invention and the remaining cells are provided with conventional battery caps. It has been found in accordance with the present invention that the center cells are usually the cells which suffer from the greatest heat build-up and hence any reduction in electrolyte level will usually occur within these cells. Consequently, the electrolyte level indicators are mounted on these cells and, furthermore, are connected through the conductors 48 to the negative terminals of the adjacent battery cells, as shown. However, it should be understood that other forms of electrical connection could be employed in accordance with this invention.

The electrolyte level indicator of the invention has been found to be highly effective in that it completely eliminates the need for any type of external wiring arrangement or any wiring harness. The light emitting diode requires only very little current and is essentially only a very limited drain on the battery and which drain is less than the self-discharge rate of the battery. Moreover, it can be seen that no battery modifications are required. The indicator can replace a conventional bayonet mounted battery cap and is fail safe in its design. Further, the light emitting diodes which are employed are bright and can actually be seen even in bright sunlight. The electronics in their simplified form are actually fully sealed in a non-corrosive epoxy and hence, there is little likelihood of damage to these components.

One of the important aspects of the present invention is the fact that the battery electrolyte level indicator of the invention can actually use a conventional battery cap, which is only slightly modified in order to function as an electrolyte level indicator. Consequently, even the raw material costs forming part of the electrolyte level indicator are relatively minimal. This coupled with the low cost of the assembly provides an electrolyte level indicator which is far superior to anything existing in the prior art and, moreover, functions as an integral unit directly on the battery where it is relatively observable by an operator of the equipment using this battery.

Another important aspect of the electrolyte level indicator of the invention is that the indicator light such as light emitting diode 26 is mounted directly on top of the cap and has a portion external of this cap so as to be readily observable when the battery is in use. This assembly allows the operator of equipment using this battery to readily and frequently scan the various battery terminals in order to insure that all lights are energized. The invention is designed in the fail-safe mode so that the operator is alerted to the fact that a cell may have a dangerously low level of electrolyte if the indicator light is not energized. Another one of the important aspects of the invention is that no wiring harness of any type is required. In effect, the invention provides for electrolyte level indication in a standard three cell six volt flooded lead acid battery and other types of batteries and which continuously monitors the level of the electrolyte. Further, no battery modification is required such as drilling holes for a probe. In this way, there is no prohibition against after market sales and the modification of the battery cap would not otherwise affect a battery warranty.

Another important aspect of present invention is that the probe does not erode readily in the battery electrolyte, which is primarily sulfuric acid.

Thus, there has been illustrated and described a unique and novel battery electrolyte level indicator which fulfills all of objects and advantages that have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and the scope of the invention are deemed to be covered by the invention.

Having thus described the invention, what I desire to claim and secure by Letters Patent is:

1. A self-contained battery electrolyte level indicator sized to be substituted for and mounted in place of a battery cap on a battery, said indicator comprising:
    a) a cap housing having a size and shape similar to that of a battery cap so as to fit in a cell access port of the battery;
    b) means for mounting the cap housing in the port of a battery cell from which a battery cap closing that cell is removed;
    c) a probe extending from the cap housing into the electrolyte and being in electrically conductive relationship therewith, said probe having a length sufficient to determine if the electrolyte is at a proper level with respect to a cell of the battery;
    d) an indicator light mounted on said cap adjacent to said probe and having a portion external to and extending outwardly of said cap so as to be readily observable when the battery is in use thereby avoiding the need for remotely located lights and a wiring harness; and
    e) electrically conductive means in said cap connecting a terminal of said light in said cap to said probe to enable an electrical circuit to be completed to a terminal of the battery.

2. The self-contained battery electrolyte level indicator of claim 1 further characterized in that an electrical conductor extends outwardly of said cap for connection to a terminal on said battery.

3. The self-contained battery electrolyte level indicator of claim 2 further characterized in that insulating means is mounted beneath said light and is in an insulating position to electrically insulate said electrical conductor from said probe.

4. The self-contained battery electrolyte level indicator of claim 4 further characterized in that said probe is arranged to be an anode and said conductor is connected to a cathode terminal of said battery.

5. The self-contained battery electrolyte level indicator of claim 4 further characterized in that said probe is formed of a nickel alloy material.

6. A self-contained battery electrolyte level indicator sized to be substituted for and mounted in place of a battery cap on a battery, said indicator comprising:
    a) a cap housing having a size and shape similar to that of a battery cap so as to fit in a cell access port of the battery;
    b) means for mounting the cap housing in the port of a battery cell from which a battery cap is removed;
    c) a probe extending from the cap housing into the electrolyte and being in an electrically conductive relationship therewith, said probe being made of a nickel alloy and arranged in that it functions as an anode when operatively connected across said battery between anode and cathode terminals of said battery; and
    d) an indicator light associated with said cap and being readily observable in connection with said cap and advising of an proper electrolyte level with respect to a cell in the battery when energized.

7. The self-contained battery electrolyte level indicator of claim 6 further characterized in that said indicator light is mounted on said cap and has a portion external to said cap so as to be readily observable when the battery is in use.

8. The self-contained battery electrolyte level indicator of claim 7 further characterized in that conductive means is in said cap and electrically connects said light to said probe to enable an electrical circuit to be completed to the cathode terminal of the battery.

9. The self-contained battery electrolyte level indicator of claim 8 further characterized in that an electrical conductor extends outwards of said cap for connection to a terminal on said battery.

10. A method of operating a battery and providing of an emergency warning condition when the electrolyte level in a battery cell has fallen below the uppermost edge of a cell plate, said method comprising:

a) removing the cap of the battery used to close a cell port of the battery;
   b) installing a new cap assembly to replace that battery cap which was removed with a light on the cap assembly and having a terminal on said light located in the cap assembly;
   c) introducing a probe on said new cap assembly which is electrically connected in said cap assembly to said terminal on said light into the electrolyte of the cell from which the battery cap was removed; and
   d) connecting the probe across the battery in such manner that a light on the battery cap assembly will energize when the electrolyte level is in contact with the probe.

11. The method of providing an emergency warning condition of claim 12 further characterized in that the method comprises operatively connecting the new cap assembly to a terminal of the battery.

12. The method of providing an emergency warning condition of claim 10 further characterized in that the method comprises operatively connecting a terminal on the new cap assembly to the cathode terminal of the battery.

13. A method of assembling a battery electrolyte level indicator using a battery cap closing a cell of a battery, said method comprising:

a) forming a hole in an upper end of the cap to receive an indicator light;
   b) electrically connecting a pair of conductors to terminals on the indicator light;
   c) inserting a ring member on a battery probe and electrically connecting one of the conductors to the battery probe;
   d) connecting the other of the pair of conductors to the ring;
   e) mounting the probe with respect to an insulator on the underside of the cap to provide insulation between the ring and the terminal on the light; and
   f) bending a portion of the ring angularly toward the insulator so as to physically engage a portion of the conductor therebetween and physically retain same.

14. The method of assembly of claim 13 further characterized in that said method comprises securing the ring member in position on the probe by means of push nuts inserted on opposite sides of the ring member.

15. The method of assembly of claim 13 further characterized in that the method comprises filling the battery cap with a filler material after assembly of the components pursuant to steps (a) through (e) therein.

16. A self-contained battery electrolyte level indicator sized to be substituted for and mounted in place of a battery cap on a battery, said indicator comprising:

a) a cap housing having a size and shape similar to that of a battery cap so as to fit in a cell access port of the battery;
   b) means for mounting the cap housing in the port of a battery cell from which a battery cap closing that cell is removed;
   c) a probe extending from the cap housing into the electrolyte and being in electrically conductive relationship therewith, said probe having a length sufficient to determine if the electrolyte is at a proper level with respect to a cell of the battery;
   d) an indicator light mounted on a top wall of said cap and having a portion external to said cap so as to be readily observable when the battery is in use thereby avoiding the need for remotely located lights and a wiring harness; and
   e) electrically conductive means in said cap connecting said light to said probe to enable an electrical circuit to be completed to a terminal of the battery.

17. A self-contained battery electrolyte level indicator sized to be substituted for and mounted in place of a battery cap on a battery, said indicator comprising:

a) a cap housing having a size and shape similar to that of a battery cap so as to fit in a cell access port of the battery;
   b) means for mounting the cap housing in the port of a battery cell from which a battery cap is removed;
   c) a probe extending from the cap housing into the electrolyte and being in electrically conductive relationship therewith, said probe having a length sufficient to determine if the electrolyte is at a proper level with respect to a cell of the battery;
   d) an indicator light mounted on said cap and having a portion external to said cap so as to be readily observable when the battery is in use thereby avoiding the need for remotely located lights and a wiring harness;
   e) electrically conductive means in said cap connecting said light to said probe to enable an electrical circuit to be completed to a terminal of the battery; and
   f) an electrical conductor extends outwardly of said cap for connection to a terminal on said battery.

18. The self-contained battery electrolyte level indicator of claim 17 further characterized in that insulating means is mounted beneath said light and is in an insulating position to electrically insulate said electrical conductor from said probe.

19. The self-contained battery electrolyte level indicator of claim 17 further characterized in that said probe is arranged to be an anode and said conductor is connected to a cathode terminal of said battery.

20. The self-contained battery electrolyte level indicator of claim 19 further characterized in that said probe is formed of a nickel alloy material.

21. A method of assembling a battery electrolyte level indicator using a battery cap closing a cell of a battery, said method comprising:

a) forming a hole in an upper end of the cap to receive an indicator light and inserting a light therein;
   b) electrically connecting a pair of conductors to terminals on the indicator light;
   c) inserting a ring member on a battery probe and electrically connecting one of the conductors to the battery probe;
   d) connecting the other of the pair of conductors to the ring;
   e) securing the ring in position on the probe by means of push nuts inserted on opposite sides of the ring,
   f) mounting the probe with respect to an insulator on the underside of the cap to provide insulation between the ring and the terminal on the light; and g) bending a portion of the ring angularly toward the insulator so as to physically engage a portion of the conductor therebetween and physically retain same.

22. A method of assembling a battery electrolyte level indicator using a battery cap closing a cell of a battery, said method comprising:

a) forming a hole in an upper end of the cap to receive an indicator light and locating a light therein;

b) electrically connecting a pair of conductors to terminals on the indicator light;

c) inserting a ring member on a battery probe and electrically connecting one of the conductors to the battery probe;

d) connecting the other of the pair of conductors to the ring;

e) mounting the probe with respect to an insulator on the underside of the cap to provide insulation between the ring and the terminal on the light; and f) bending a portion of the ring angularly toward the insulator so as to physically engage a portion of the conductor therebetween and physically retain same; and g) filling the battery cap with a filler material after assembly of the components pursuant to steps (a) through (f) hereof.

* * * * *